(12) United States Patent
Yoshii et al.

(10) Patent No.: US 12,423,882 B2
(45) Date of Patent: Sep. 23, 2025

(54) PROCESSING DEVICE, PROCESSING SYSTEM, HEAD MOUNTED DISPLAY, PROCESSING METHOD, AND STORAGE MEDIUM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takanori Yoshii, Kawasaki Kanagawa (JP); Takashi Ishii, Yokohama Kanagawa (JP); Yoshiyuki Hirahara, Mishima Shizuoka (JP); Takehiro Kato, Yokohama Kanagawa (JP); Yasuo Namioka, Nerima Tokyo (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 259 days.

(21) Appl. No.: 18/298,957

(22) Filed: Apr. 11, 2023

(65) Prior Publication Data
US 2023/0326096 A1    Oct. 12, 2023

(30) Foreign Application Priority Data

Apr. 12, 2022 (JP) .................................. 2022-065753
Mar. 28, 2023 (JP) .................................. 2023-050991

(51) Int. Cl.
*G06T 11/00* (2006.01)
*G06T 7/00* (2017.01)

(52) U.S. Cl.
CPC ............ *G06T 11/00* (2013.01); *G06T 7/0008* (2013.01); *G06T 2207/30164* (2013.01)

(58) Field of Classification Search
CPC .................. G06T 11/00; G06T 7/0008; G06T 2207/30164
See application file for complete search history.

(56) References Cited

U.S. PATENT DOCUMENTS

| | | | |
|---|---|---|---|
| 2007/0073437 A1* | 3/2007 | Walt, II | G05B 19/41805 700/174 |
| 2016/0375532 A1* | 12/2016 | Sasaki | B25J 15/0019 81/57.36 |
| 2019/0034733 A1 | 1/2019 | Iwata | |
| 2021/0158587 A1 | 5/2021 | Marchand | |
| 2021/0350588 A1 | 11/2021 | Tanida et al. | |
| 2023/0085797 A1 | 3/2023 | Yoshii et al. | |

FOREIGN PATENT DOCUMENTS

| | | |
|---|---|---|
| JP | 2013-003773 A | 1/2013 |
| JP | 6655633 B2 | 2/2020 |
| JP | 6802547 B2 | 12/2020 |
| JP | 2023-045089 A | 4/2023 |

* cited by examiner

*Primary Examiner* — Michelle Chin
(74) *Attorney, Agent, or Firm* — Knobbe, Martens, Olson & Bear, LLP

(57) ABSTRACT

According to one embodiment, a processing device causes a display of a first object at a position separated from a fastening location of a screw. The first object is virtual and indicates the fastening location. The processing device associates first data and second data when a prescribed physical object contacts the first object and the first data is received from a tool turning the screw. The second data is related to the fastening location.

12 Claims, 13 Drawing Sheets

PROCESSING DEVICE, PROCESSING SYSTEM, HEAD MOUNTED DISPLAY, PROCESSING METHOD, AND STORAGE MEDIUM

CROSS-REFERENCE TO RELATED APPLICATIONS

This application is based upon and claims the benefit of priority from Japanese Patent Application No. 2022-065753, filed on Apr. 12, 2022; and Japanese Patent Application No. 2023-050991, filed on Mar. 28, 2023; the entire contents of which are incorporated herein by reference.

FIELD

Embodiments described herein relate generally to a processing device, a processing system, a head mounted display, a processing method, and a storage medium.

BACKGROUND

There is technology that guides a task by displaying a virtual object during the task. It is desirable for such technology to be able to guide a worker more effectively.

DETAILED DESCRIPTION

Figure 1:
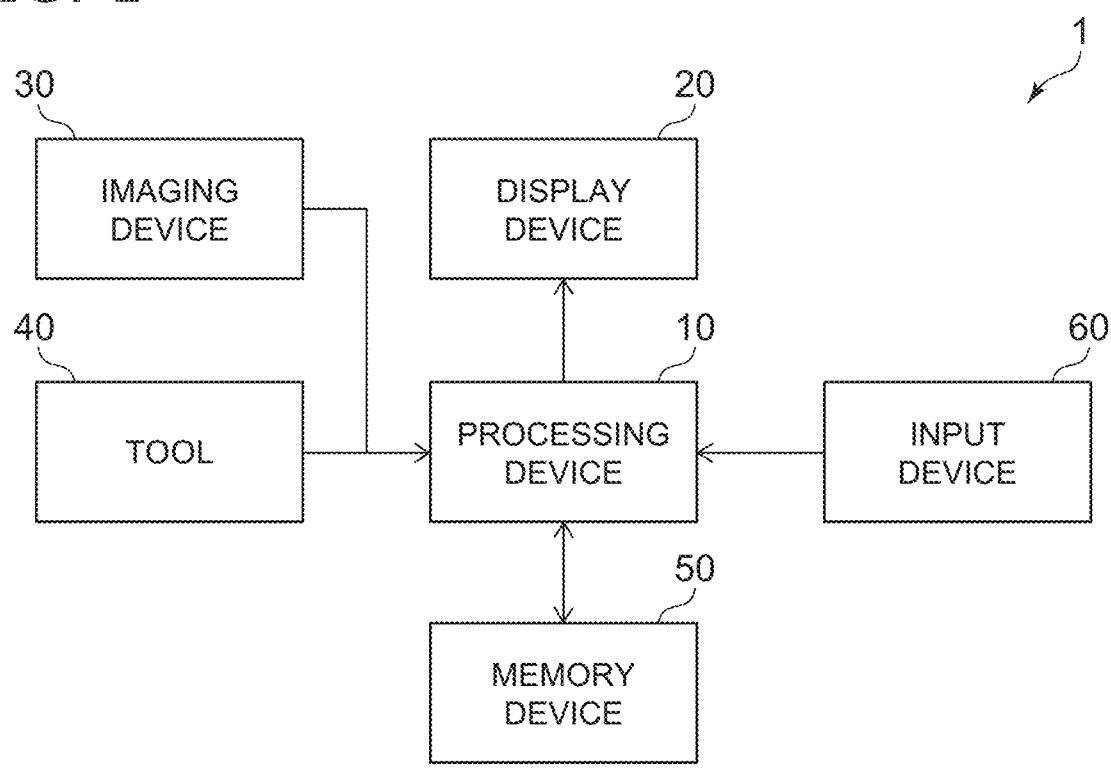
FIG. 1 is a functional block diagram showing a processing system according to an embodiment.

According to one embodiment, a processing device causes a display of a first object at a position separated from a fastening location of a screw. The first object is virtual and indicates the fastening location. The processing device associates first data and second data when a prescribed physical object contacts the first object and the first data is received from a tool turning the screw. The second data is related to the fastening location.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing therein above are marked with like reference numerals, and a detailed description is omitted as appropriate.

In the manufacture of a product, there are cases where a screw is tightened to fix parts to each other. When tightening screws, the fastening locations may be difficult to see, the necessary tightening force (tightening torque) may be different between the screws, the tightening sequence may be predetermined, etc. Therefore, errors may occur such as forgetting to tighten a screw into a fastening location, using insufficient tightening torque, using a different tightening sequence, etc. Embodiments of the invention are applicable to a screw-tightening task, and can be used to avoid such errors.

FIG. 1 is a functional block diagram showing a processing system according to an embodiment.

As shown in FIG. 1, the processing system 1 according to the embodiment includes a processing device 10, a display device 20, an imaging device 30, a tool 40, a memory device 50, and an input device 60.

The processing device 10 processes various data. The processing device 10 also controls the display of the display device 20. The display device 20 displays information to a user. The imaging device 30 images the appearance of the task and repeatedly acquires images. The imaging device 30 may acquire a video image. In such a case, static images are sequentially cut out from the video image. Other than two-dimensional images, it is favorable for the imaging device 30 to be able to acquire the horizontal depth (the depth). An imaging device 30 for obtaining two-dimensional images and another imaging device 30 for obtaining the depth may be provided.

For example, the display device 20 and the imaging device 30 are embedded in a head mounted display (HMD). A worker that performs screw-tightening wears the HMD. The configuration and display content of the display device 20 are arbitrary. For example, the HMD includes a lens positioned frontward of an eye of the worker. The display device 20 projects information related to the screw-tightening onto a transmissive lens. The user can visually check reality through the lens and can visually check the information visible on the lens. A display device 20 that is non-transmissive may be positioned frontward of the eyes of the worker. The display device 20 displays the image acquired by the imaging device 30 and the information related to the screw-tightening. The user can know reality based on the image of the imaging device 30.

In either case, the worker can visually check the information related to the screw-tightening based on the display of the display device 20. Technology in which the real world perceived by a human is enhanced, augmented, or merged by data processing is known as augmented reality (AR) or mixed reality (MR).

The configuration of the HMD also is arbitrary. For example, the configuration of the HMD can be monocular goggle-type, binocular eyeglasses-type, hat-type, helmet-type, fully-head-covering, etc. Other than the imaging device 30, an imaging device for calculating the positions of the eyes of the user, the orientation of the line of sight, etc., may be included in the HMD. The processing device 10 calculates the viewpoint of the user in the display device 20 based on images obtained by such an imaging device. In other words, the HMD may include an eye tracker function.

The tool 40 is a wrench, a screw driver, etc., used to turn the screw. The tool 40 can measure a torque value. The tool 40 transmits, to the processing device 10, first data related to the tightening. The processing device 10 manages the data related to the screw-tightening based on the images obtained by the imaging device 30, the data received from the tool 40, etc. The memory device 50 stores the data obtained by the processing of the processing device 10, the first data from the tool 40, the data used in the display control, etc.

The user uses the input device 60 to input data to the processing device 10. For example, the input device 60 is a mouse, a keyboard, etc. The input device 60 may be a microphone embedded in the HMD. Or, a virtual input device such as a keyboard, a button, etc., may be displayed in the display device 20. In such a case, the user can input data to the processing device 10 by operating the virtual input device. Data may be input to the processing device 10 by hand gestures using motion detection.

Figure 2:
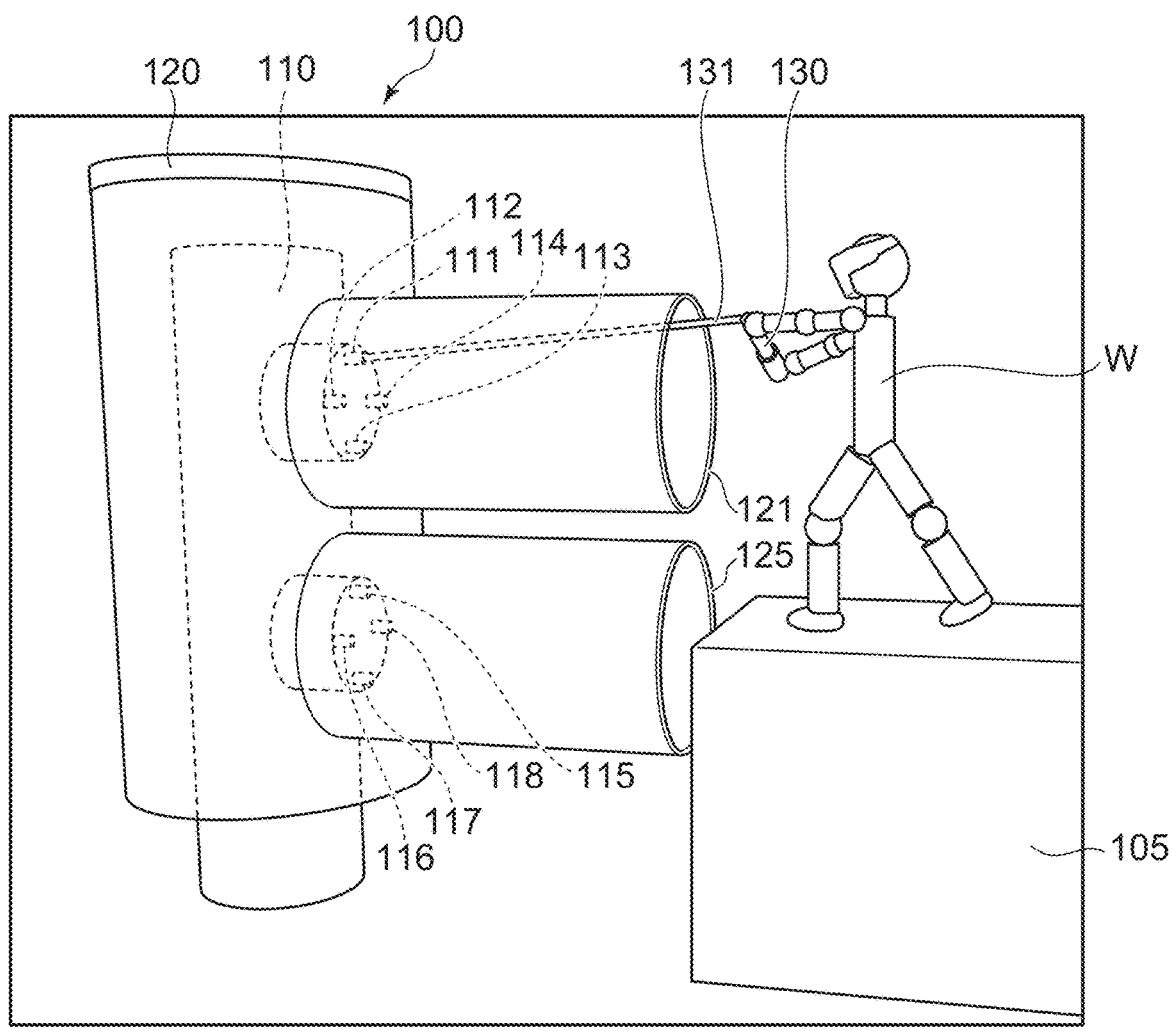
FIG. 2 is a schematic view showing a screw-tightening task.
Figure 3:
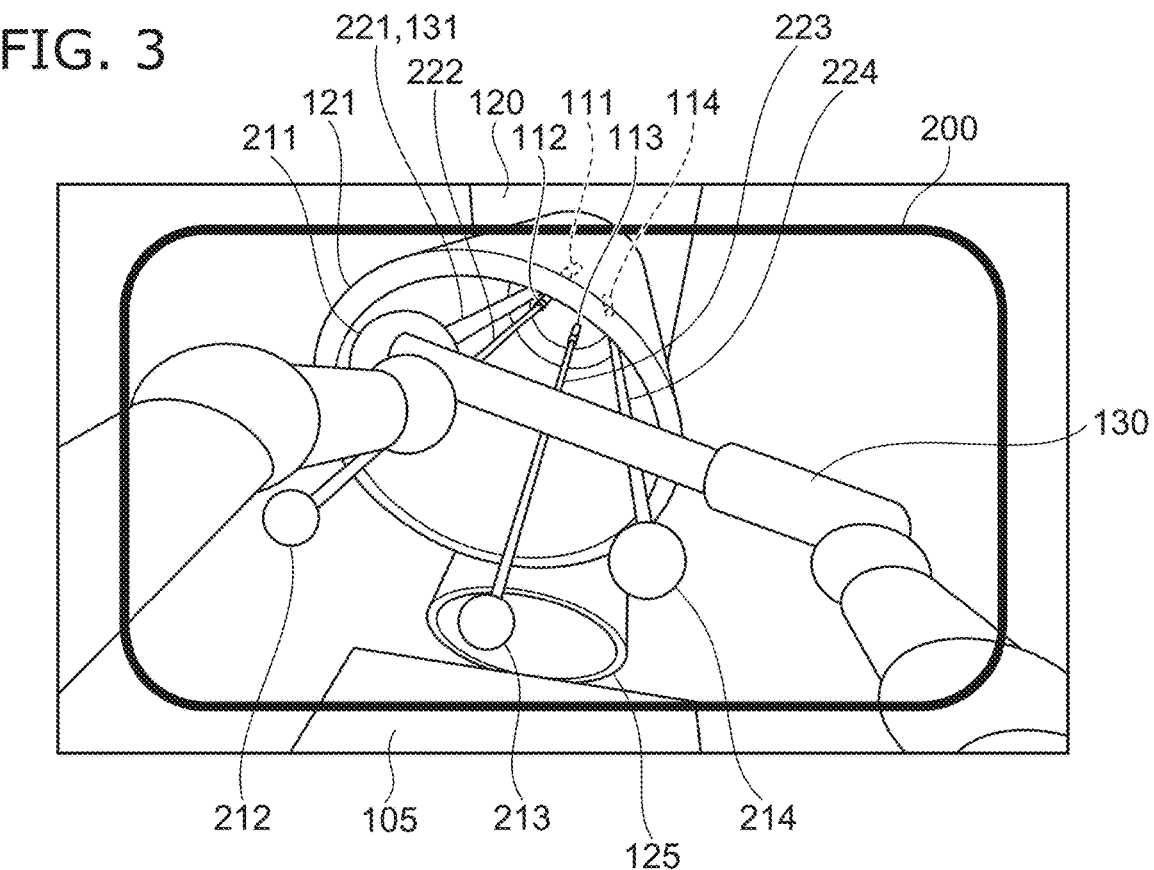
FIG. 3 is a schematic view showing an output example of the processing device according to the embodiment.

FIG. 2 is a schematic view showing a screw-tightening task. FIG. 3 is a schematic view showing an output example of the processing device according to the embodiment.

A specific example of the processing system 1 according to the embodiment will now be described with reference to FIGS. 2 and 3. For example, as shown in FIG. 2, a worker W performs screw-tightening for an article 100. The worker W wears a HMD. The article 100 is a part (a module or component) used in a product, a partly-finished product, etc.

In the illustrated example, the article 100 is large; and the worker W performs the screw-tightening while on a platform 105. The article 100 includes a circular columnar member 110 and a tubular member 120. Multiple fastening locations 111 to 118 are provided in the circular columnar member 110. The "fastening point" is where the screw is tightened and corresponds to a point at which the screw hole is provided. An opening 121 corresponding to the fastening locations 111 to 114 and an opening 125 corresponding to the fastening locations 115 to 118 are provided in the tubular member 120. The worker W tightens screws respectively at the fastening locations 111 to 114 via the opening 121, and tightens screws respectively at the fastening locations 115 to 118 via the opening 125.

The worker W fastens the screws at the fastening locations 111 to 118 by using a wrench 130 to which an extension bar 131 is mounted. The wrench 130 is an example of the tool 40. The wrench 130 includes a torque sensor and can measure a torque value in the screw-tightening. The torque value is an example of the first data. The wrench 130 transmits the maximum measured torque value to the processing device 10. The wrench 130 may continuously record the measured torque value and transmit time-series data of the torque value to the processing device 10. Together with the torque value, the wrench 130 may transmit, to the processing device 10, identification data (ID) of the wrench 130 and the time at which the torque value was measured.

The wrench 130 may compare the measured torque value with a preset threshold. When the torque value is greater than the threshold, the wrench 130 records the time (the timestamp) of the tightening and a fastening record indicating that the screw has been tightened. The wrench 130 transmits the ID, fastening record, and time of the wrench 130 to the processing device 10. The fastening record is another example of the first data.

Based on the images obtained by the imaging device 30, the processing device 10 causes the display device 20 to display a user interface (UI) 200 shown in FIG. 3. Here, an example will be described in which the display device 20 projects information onto a transmissive lens. The worker W can visually check the UI 200 of the display device 20, and can visually check, through the lens, the hands of the worker W, the fastening location 112, the fastening location 113, the opening 121, the wrench 130, the extension bar 131, etc.

Virtual objects 211 to 214 and virtual objects 221 to 224 are displayed in the UI 200. The objects 211 to 214 each are examples of first objects. The objects 221 to 224 each are examples of second objects. The objects 211 to 214 correspond respectively to the fastening locations 111 to 114 and are displayed at positions separated from the fastening locations 111 to 114. The objects 221 to 224 respectively connect the fastening locations 111 to 114 and the objects 211 to 214.

In the illustrated example, the worker W can visually check the fastening locations 112 and 113 via the opening 121. The objects 222 and 223 are not hidden by the article, and other than portions hidden by a hand, an arm, the wrench 130, etc., the entire objects 222 and 223 are displayed. On the other hand, the fastening locations 111 and 114 are hidden by the tubular member 120; and the worker W cannot visually check the fastening locations 111 and 114. For description, the fastening locations 111 and 114 that are hidden and cannot be visually checked are shown by broken lines in FIG. 3. A portion of the object 221 is hidden by the tubular member 120 and is not displayed. Another portion of the object 221 is not hidden by the tubular member 120 and is displayed; and the orientation of the other portion of the object 221 indicates the position of the fastening location 111. Similarly for the object 224, only a portion of the object 224 is displayed, and the portion indicates the position of the fastening location 114.

Or, the portions of the objects 221 and 224 hidden by the tubular member 120 also may be displayed, and the display forms of the portions not hidden by the tubular member 120 may be different from the display forms of the portions hidden by the tubular member 120. In any case, the worker W can use the existence and orientations of the objects 221 to 224 to ascertain the positions of the fastening locations 111 to 114.

In the example shown in FIGS. 2 and 3, the worker W is performing screw-tightening for the fastening location 111. Based on the image of the imaging device 30, the processing device 10 determines whether or not the prescribed physical object contacts (overlaps) the object 211 corresponding to the fastening location 111. For example, the prescribed physical object is the body of the worker W. The processing device 10 determines the contact between the object 211 and the body of the worker W. The prescribed physical object may be a tool. The processing device 10 may determine contact between the wrench 130 and the object 211.

As an example, the processing device 10 estimates the skeleton of the worker W based on an image. The positions of the joints of the worker W are obtained by estimating the skeleton. The processing device 10 determines that the body of the worker W overlaps the object 211 when the position of any joint overlaps the region in which the object 211 is displayed.

The processing device 10 may determine whether or not a specific joint contacts the object 211. For example, the processing device 10 determines whether or not the joint of at least a portion of the hand overlaps the object 211. The processing device 10 determines that there is no contact with the object 211 when the joint of an elbow, an arm, or the like overlaps the object 211. Here, an example is described in which the processing device 10 determines whether or not a hand of the worker contacts an object.

A pose estimation model can be used to estimate the skeleton. The pose estimation model is pretrained according to the input of images to estimate the skeleton (the pose) of a person visible in the images. The processing device 10 inputs the image of the imaging device 30 to the pose estimation model and acquires the estimation result from the pose estimation model. Pose estimation models include neural networks. It is favorable for the pose estimation model to include a convolutional neural network (CNN). OpenPose, DarkPose, CenterNet, etc., can be used as the pose estimation model.

For example, the display position of the object 211 corresponds to the position of the hand of the worker W when tightening the screw into the fastening location 111. Because the object 211 is displayed, the worker W can easily ascertain where the hand should be located to tighten the screw. The object 221 that connects the fastening location 111 and the object 211 also is displayed in the UI 200. By using the object 221, the worker W can easily ascertain the direction of the fastening location 111 with respect to the object 211 and how to orient the wrench 130 with respect to the hand. The user can easily ascertain the existence and position of the fastening location 111 even when the fastening location 111 is difficult to see.

Similarly, the display positions of the objects 212 to 214 correspond respectively to the positions of the hand of the worker W when tightening the screws into the fastening locations 112 to 114. The user can easily ascertain the existence and positions of the fastening locations 112 to 114.

Favorably, the processing device 10 detects the tips of the fingers and multiple joints including joints of the hand other than the tips of the fingers. For example, the processing device 10 detects MP joints, PIP joints, DIP joints, CM joints, IP joints, wrist joints, fingertips, etc. The processing device 10 determines that screw-tightening into the fastening location 111 is being performed when one of these parts contacts the object 211.

When the hand of the worker W contacts the object 211, the processing device 10 determines that the screw is being tightened into the fastening location 111. On the other hand, the processing device 10 receives the first data related to the tightening from the wrench 130. When the hand of the worker W is in contact with the object 211 and the first data is received from the wrench 130, the processing device 10 determines that the screw is being tightened into the fastening location 111. The processing device 10 associates the first data and second data related to the fastening location 111. The processing device 10 stores the associated data in the memory device 50. The second data is an ID indicating the fastening location 111, the position of the fastening location 111, etc.

It is not always necessary for the contact of the hand with the object 211 and the reception of the first data from the wrench 130 to be simultaneous. When the hand contacts the object 211, the processing device 10 may maintain the determination result that the hand is in contact with the object 211 for a preset time even after the hand has separated from the object 211. Accordingly, the first data and the second data can be more reliably associated even when the hand of the worker W temporarily separates from the object 211, a time lag exists in the communication between the wrench 130 and the processing device 10, etc. The start point of the period in which the determination result is maintained is arbitrary. The start point may be the instant at which the hand is initially determined to contact the object 211, or the instant at which the hand is determined not to be in contact with the object 211 after the contact was determined.

Figure 4:
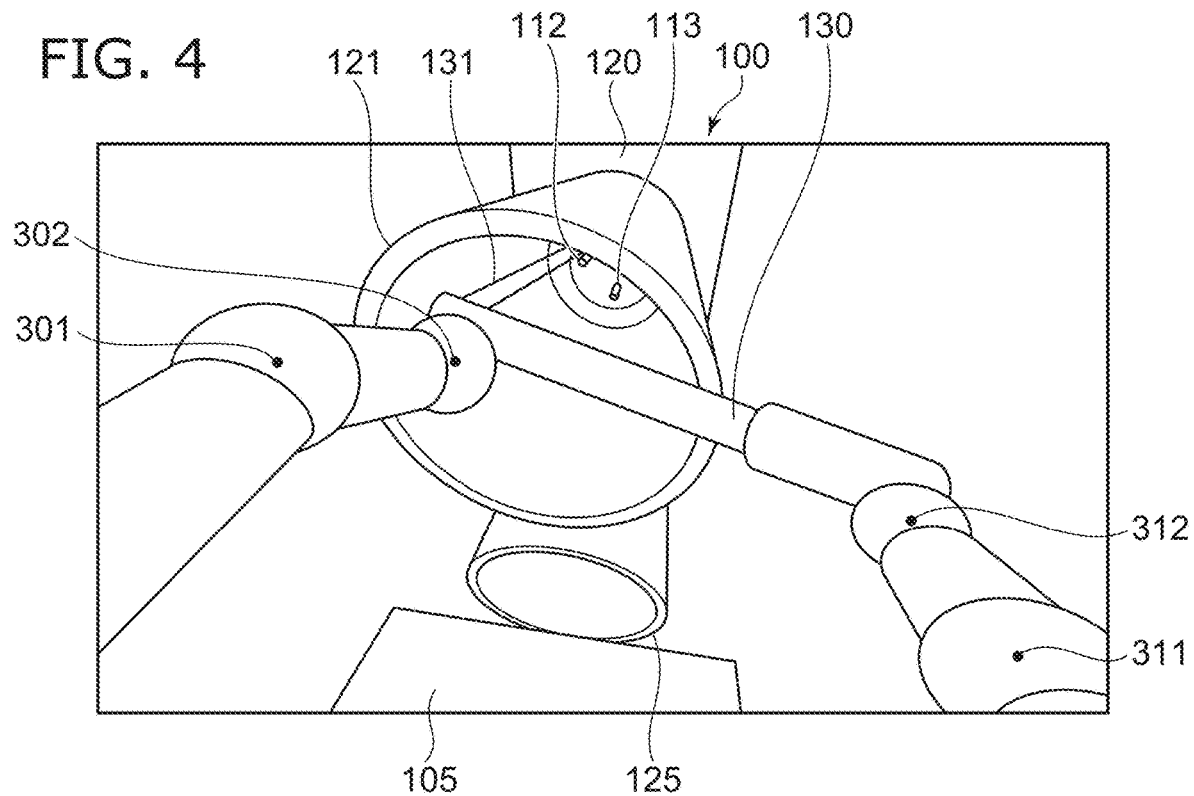
FIG. 4 is a schematic view for describing processing by the processing device according to the embodiment.

FIG. 4 is a schematic view for describing processing by the processing device according to the embodiment.

When the state shown in FIG. 3 is imaged by the imaging device 30, the processing device 10 detects the skeleton of the worker W based on the image. FIG. 4 is an example of the detection result. A left elbow 301, a left hand 302, a right elbow 311, and a right hand 312 of the worker W are detected by the skeleton detection. The processing device 10 determines that screw-tightening into the fastening location 111 is being performed when the left hand 302 or the right hand 312 contacts the object 211. The processing device 10 associates the first data obtained when screw-tightening into the fastening location 111 with the second data related to the fastening location 111.

For example, when the wrench 130, the extension bar 131, the left elbow 301, or the right elbow 311 contacts the object 211, the processing device 10 does not determine that screw-tightening into the fastening location 111 is being performed. Accordingly, when the body of the worker W contacts the object 211 other than when the screw-tightening into the fastening location 111 is being performed, the likelihood of an erroneous determination indicating that the screw-tightening into the fastening location 111 is being performed can be reduced.

When the first data includes the torque value, the processing device 10 may determine whether or not the tightening into the fastening location is finished. The processing device 10 refers to a threshold set for the tightened fastening location. When the torque value is greater than the threshold, the processing device 10 determines that the screw-tightening into the fastening location has finished. When the first data includes a fastening record of the screw, the processing device 10 determines that the screw-tightening into the fastening location has finished when the first data is received.

Instead of contact between the first object and the body of the worker W, the processing device 10 may determine whether or not a tool contacts the first object. The processing device 10 may determine that the screw is being tightened into the fastening location 111 when the first data from the wrench 130 is received in a state in which the wrench 130 contacts the object 211. The processing device 10 may determine both contact between the object and the body of the worker W and contact between the object and the tool. The processing device 10 may determine the contact with the first object of any implement other than the tool. The processing device 10 determines contact with the first object of a predetermined physical object.

Figure 5A:
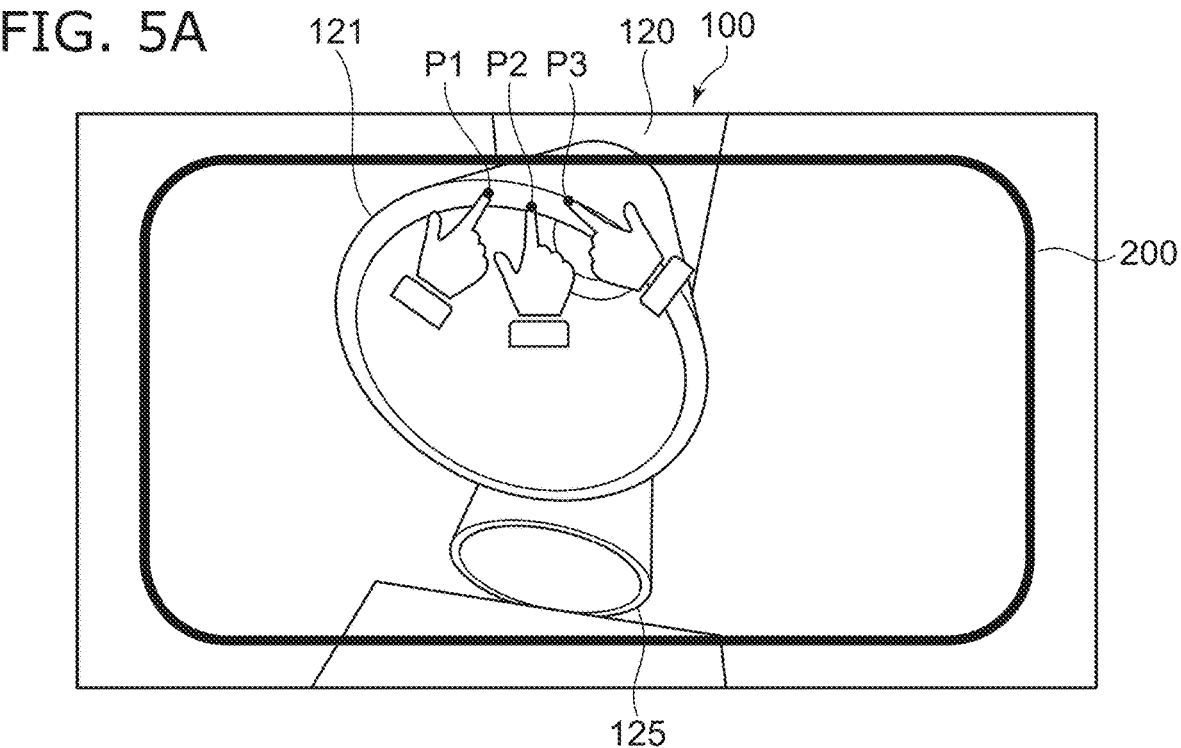
FIGS. 5A and 5B are schematic views for describing a method for setting the origin.
Figure 5B:
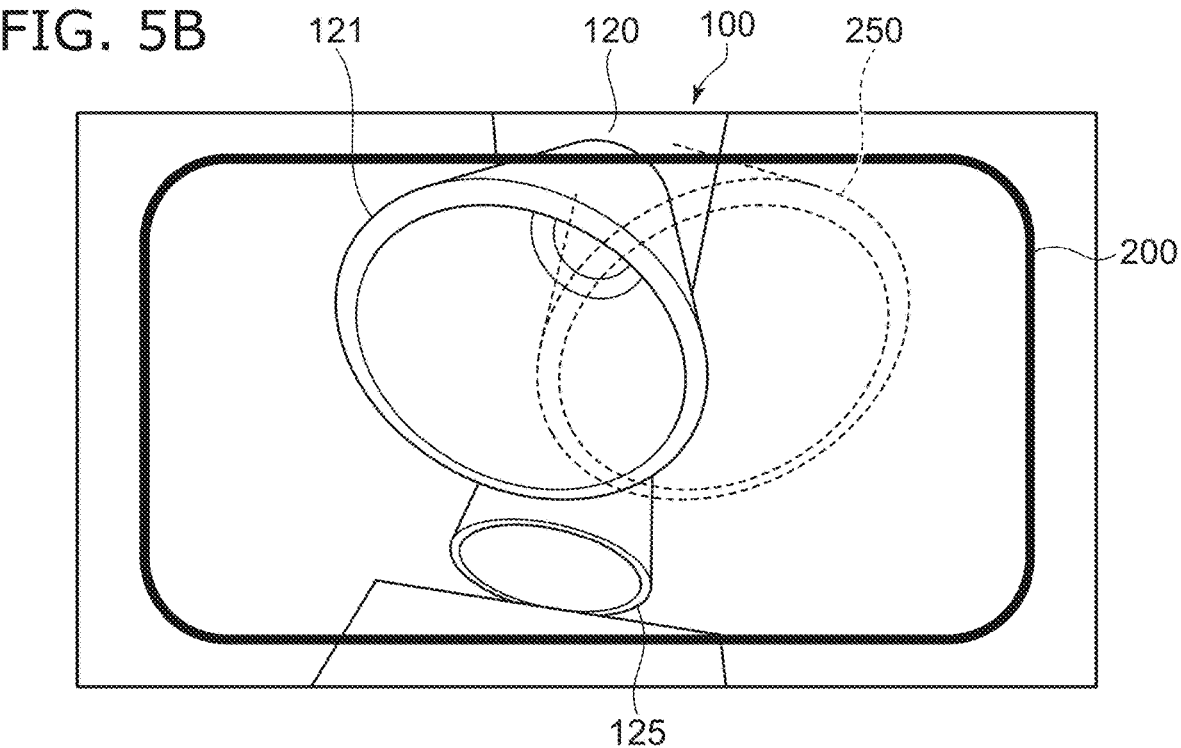

FIGS. 5A and 5B are schematic views for describing a method for setting the origin.

The display positions of the objects 211 to 214 and the objects 221 to 224 are calculated based on a origin. The processing device 10 accepts a selection of the screw-tightening to be performed and a setting of the origin. For example, a prescribed position of the article 100 is marked with an AR marker, a QR code (registered trademark), etc. The processing device 10 detects the AR marker or the QR code (registered trademark) that is visible in the image. The processing device 10 generates spatial coordinates by using the AR marker or the QR code (registered trademark) as the origin. Or, according to the article, there are cases where an AR marker or a QR code (registered trademark) cannot be attached. In such a case, for example, the worker W uses a finger to point to three points P1 to P3 as the origin as shown in FIG. 5A. The processing device 10 uses the three points of the finger tip as the origin to generate the spatial coordinates.

As shown in FIG. 5B, an object 250 for setting the origin may be displayed. The worker W adjusts the position and orientation of the HMD so that the real article overlaps the displayed object 250. When the article is small, the worker W may adjust the position and orientation of the article to overlap the displayed object 250. The processing device 10 uses the position and orientation of the HMD when the article is determined by image processing to overlap the object 250 as the origin to generate the spatial coordinates.

The processing device 10 causes the display of the objects 211 to 214 and the objects 221 to 224 at positions preset for the selected screw-tightening in the generated spatial coordinates.

Or, instead of an origin, the processing device 10 may detect the fastening location based on an image obtained by the imaging device 30. For example, the fastening location is detected in the obtained image by comparing the image and a template image of the fastening location that is prepared beforehand. The processing device 10 causes the display of the first and second objects to correspond to the detected fastening location.

FIG. 6A, FIG. 6B, FIG. 7A, FIG. 7B, FIG. 8A, and FIG. 8B are schematic views showing output examples of the processing device according to the embodiment.

The processing device 10 may change the display of each object according to the content or progress of the task. As an example, the screw-tightening of the fastening locations 111 to 114 is performed in the order of the fastening location 111, the fastening location 113, the fastening location 112, and the fastening location 114. In such a case, the processing device 10 displays only the object corresponding to the fastening location to be tightened at that time. When the tightening into the fastening location shown by the object is determined to be finished, the processing device 10 displays only the object corresponding to the next fastening location to be tightened.

Figure 6A:
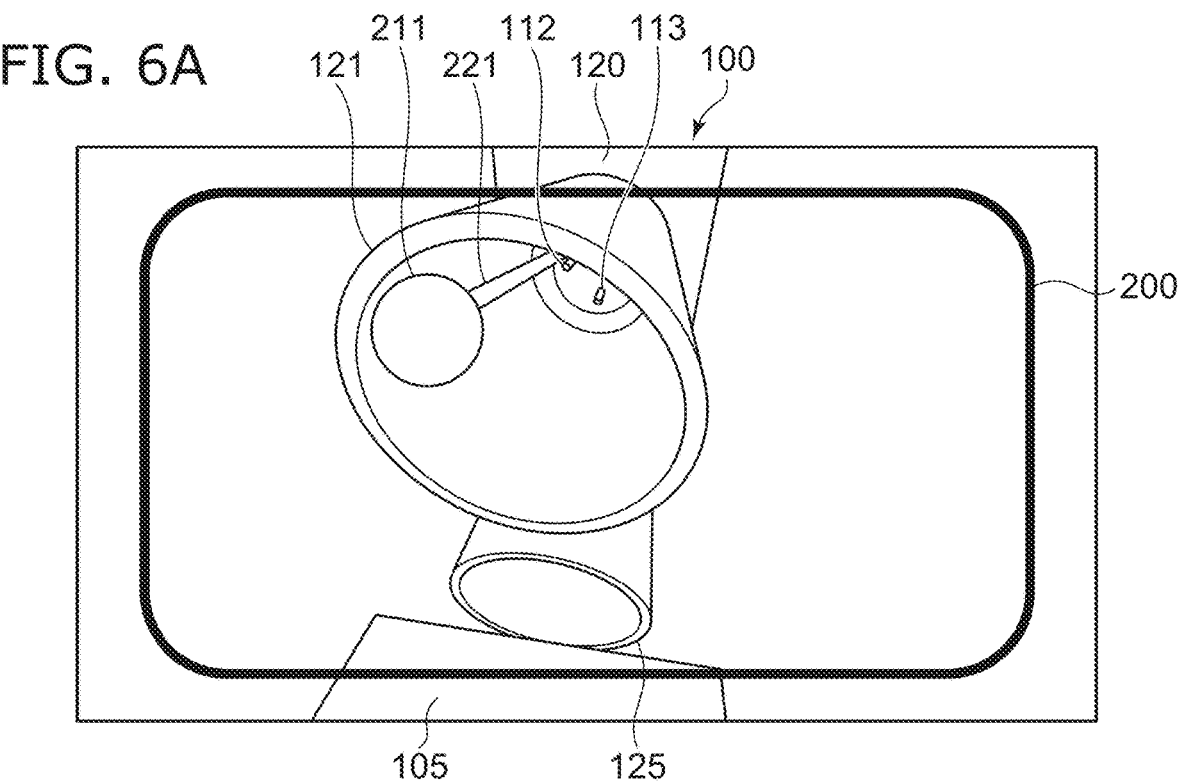
FIG. 6A and FIG. 6B are schematic views showing output examples of the processing device according to the embodiment.
Figure 6B:
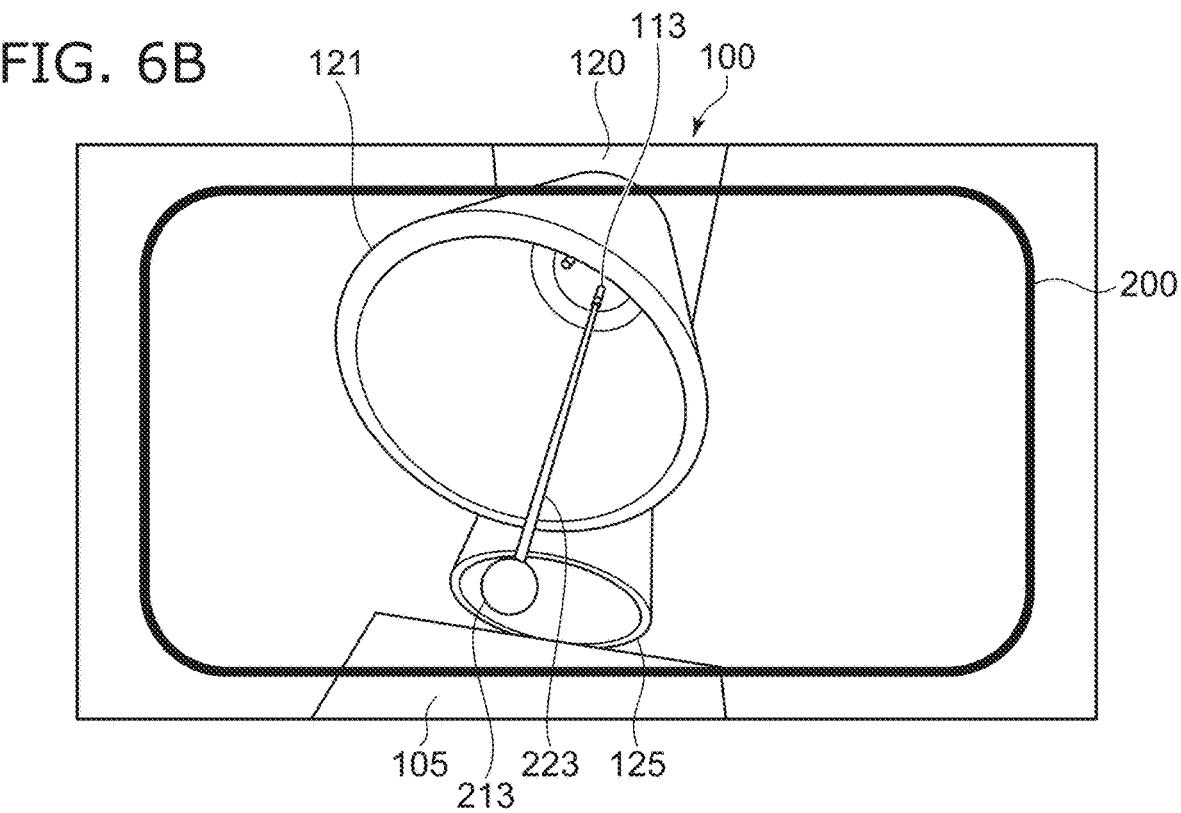

In the example of FIG. 6A, only the object 211 corresponding to the fastening location 111 is displayed. When the worker W finishes the screw-tightening into the fastening location 111, only the object 213 corresponding to the fastening location 113 is displayed as shown in FIG. 6B. By sequentially displaying the object according to the sequence of the screw-tightening, the worker W can perform the screw-tightening of the fastening locations in a predetermined sequence.

The display of the object may be changed according to the screw-tightening count. When multiple screws are tightened in one member, there are cases where a screw that is already tightened is loosened by the tightening of a new screw. It is favorable for the screw that is already tightened to be subsequently re-tightened. For example, the worker W re-performs the screw-tightening into the fastening locations 111 to 114 after the screw-tightening has been performed for all of the fastening locations 111 to 114.

Figure 7A:
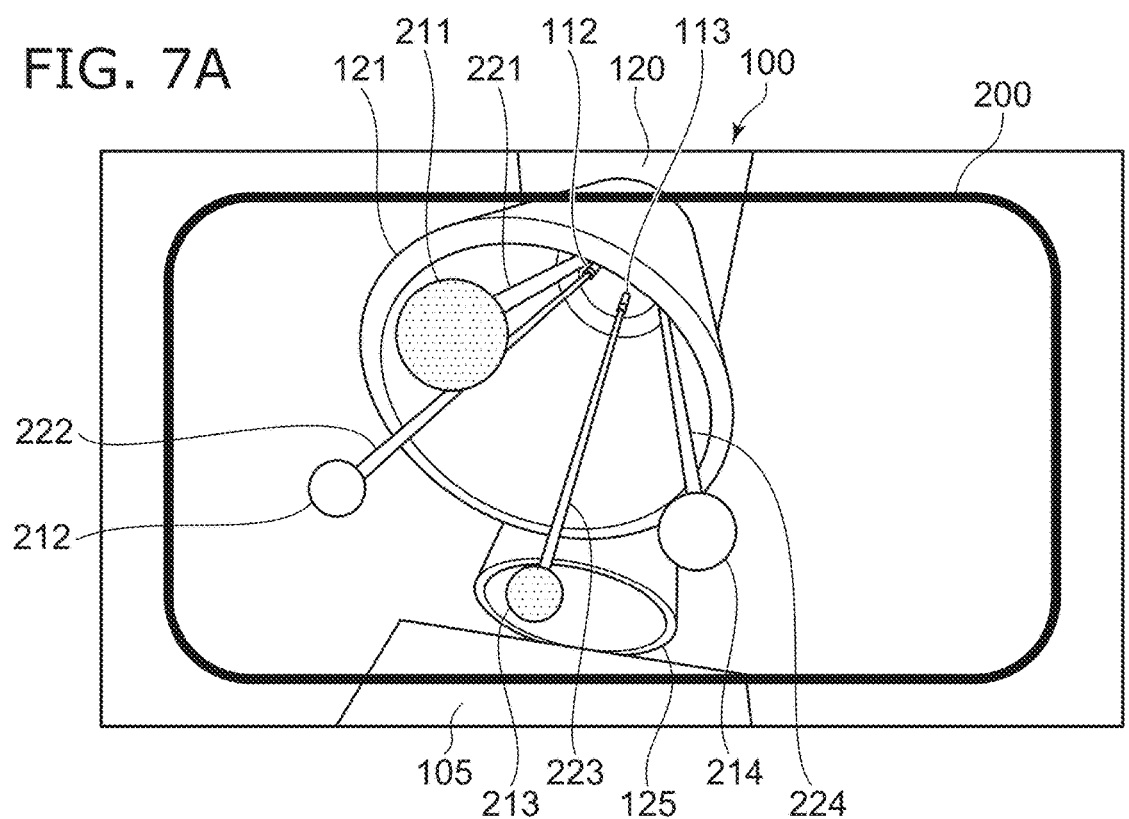
FIG. 7A and FIG. 7B are schematic views showing output examples of the processing device according to the embodiment.

In the example shown in FIG. 7A, the screw-tightening is finished for the fastening locations 111 and 113. The screw-tightening is not finished for the fastening locations 112 and 114. Therefore, the display forms of the objects 211 and 213 corresponding to the fastening locations 111 and 113 are different from the display forms of the objects 212 and 214 corresponding to the fastening locations 112 and 114.

For example, the display form that is set to be different is at least one selected from the group consisting of a color, a size, and a shape. Here, "color" includes not only hue but also gradation, texture (patterns), and patterns such as dots, hatching, etc. The display form of the object may be changed by changing the gradation, texture, or pattern without changing the hue.

Figure 7B:
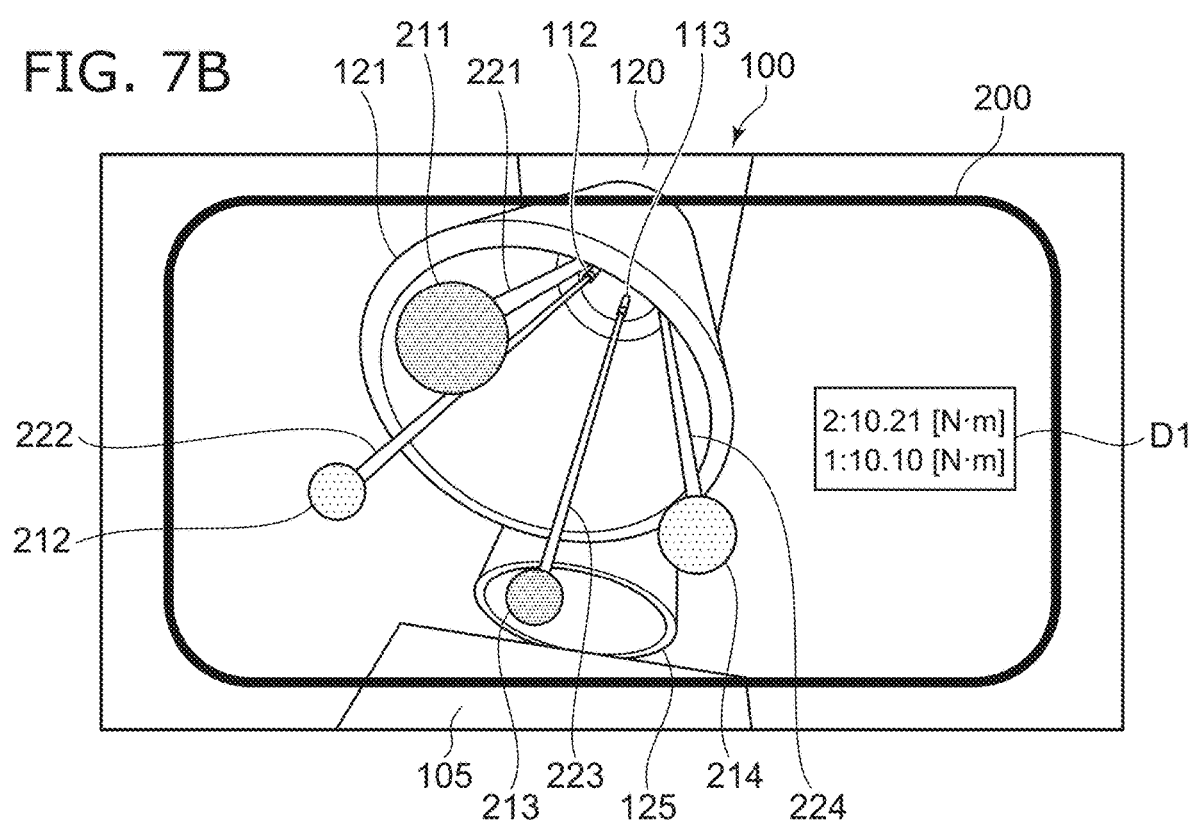

FIG. 7B shows the state after the example shown in FIG. 7A. In the example, the screw-tightening is finished for the fastening locations 111 to 114. Then, the screws of the fastening locations 111 and 113 are further tightened. The screws of the fastening locations 112 and 114 are not yet re-tightened. Therefore, the display forms of the objects 211 and 213 corresponding to the fastening locations 111 and 113 are different from the display forms of the objects 212 and 214 corresponding to the fastening locations 112 and 114. Also, the display forms of the objects 211 and 213 shown in FIG. 7B are different from the display forms of the objects 211 to 214 shown in FIG. 7A. By changing the display form of the object according to the progress of the task, the worker W can easily ascertain the fastening location to be performed.

First data D1 that is received from the wrench 130 may be displayed when the processing device 10 determines that a specific fastening location is being tightened as shown in FIG. 7B. In the illustrated example, the torque value is displayed as the first data. Also, the torque value of the first screw-tightening and the torque value of the second screw-tightening are displayed for the specific fastening location. The fastening record may be displayed as the first data. For example, the processing device 10 may display the symbol (circle) indicating tightened, or the symbol (cross) indicating not yet tightened. The time that the first data is received may be displayed together with each torque value or each fastening record.

Figure 8A:
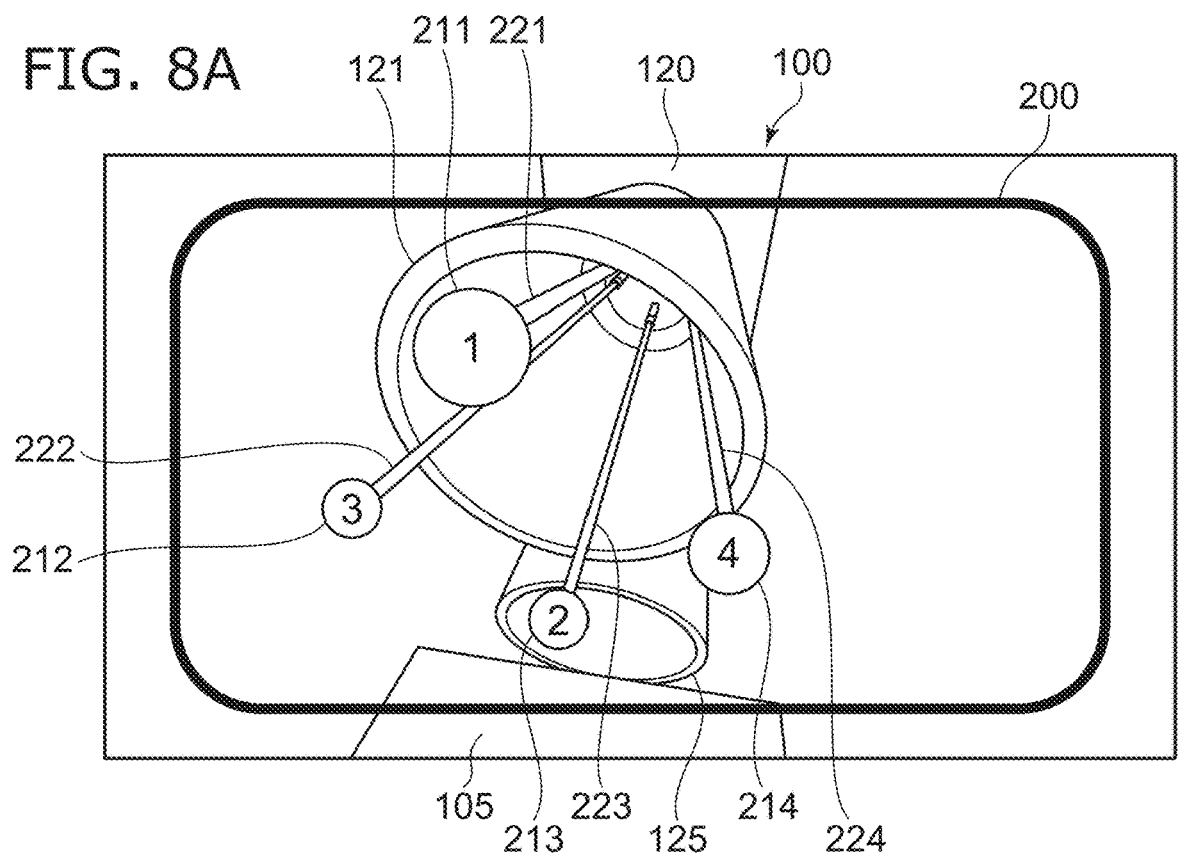
FIG. 8A and FIG. 8B are schematic views showing output examples of the processing device according to the embodiment.
Figure 8B:
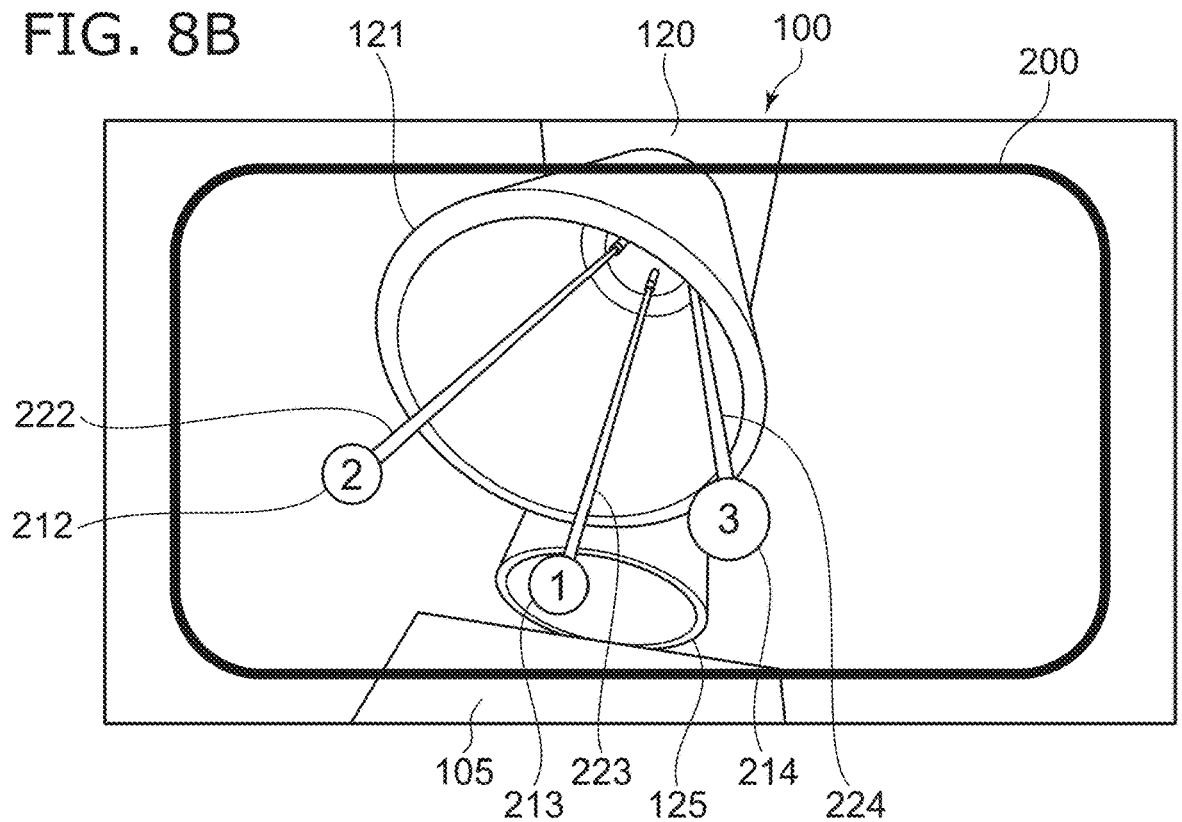

As shown in FIG. 8A, the processing device 10 may display symbols indicating the sequence of the screw-tightening for the objects 211 to 214. In the illustrated example, numerals are displayed as the symbols. The symbols may be displayed to overlap the objects, or may be displayed proximate to the objects without overlapping. When the screw-tightening is finished for the fastening location 111, the processing device 10 may change the symbols indicating the sequence as shown in FIG. 8B. The object 211 that corresponds to the fastening location 111 for which the screw-tightening is finished may be changed to a non-display by the processing device 10.

There are cases where a tightened screw is marked to indicate that the task is finished. When the screw-tightening is finished, the worker W marks the screw or the vicinity of the screw. The tool of the screw-tightening may automatically perform the marking when finished. The processing device 10 may detect the mark based on an image. When the screw-tightening is determined to be finished, the processing device 10 refers to the color of the mark used for the screw-tightening. The processing device 10 determines whether or not the number of pixels of the color of the mark in the image obtained by the imaging device 30 are greater than a preset threshold. When the number of pixels is greater than the threshold, the processing device 10 determines that the screw has been marked. For example, the processing device 10 further associates the detection result indicating that the mark is detected with the fastening location and the first data.

Figure 9:
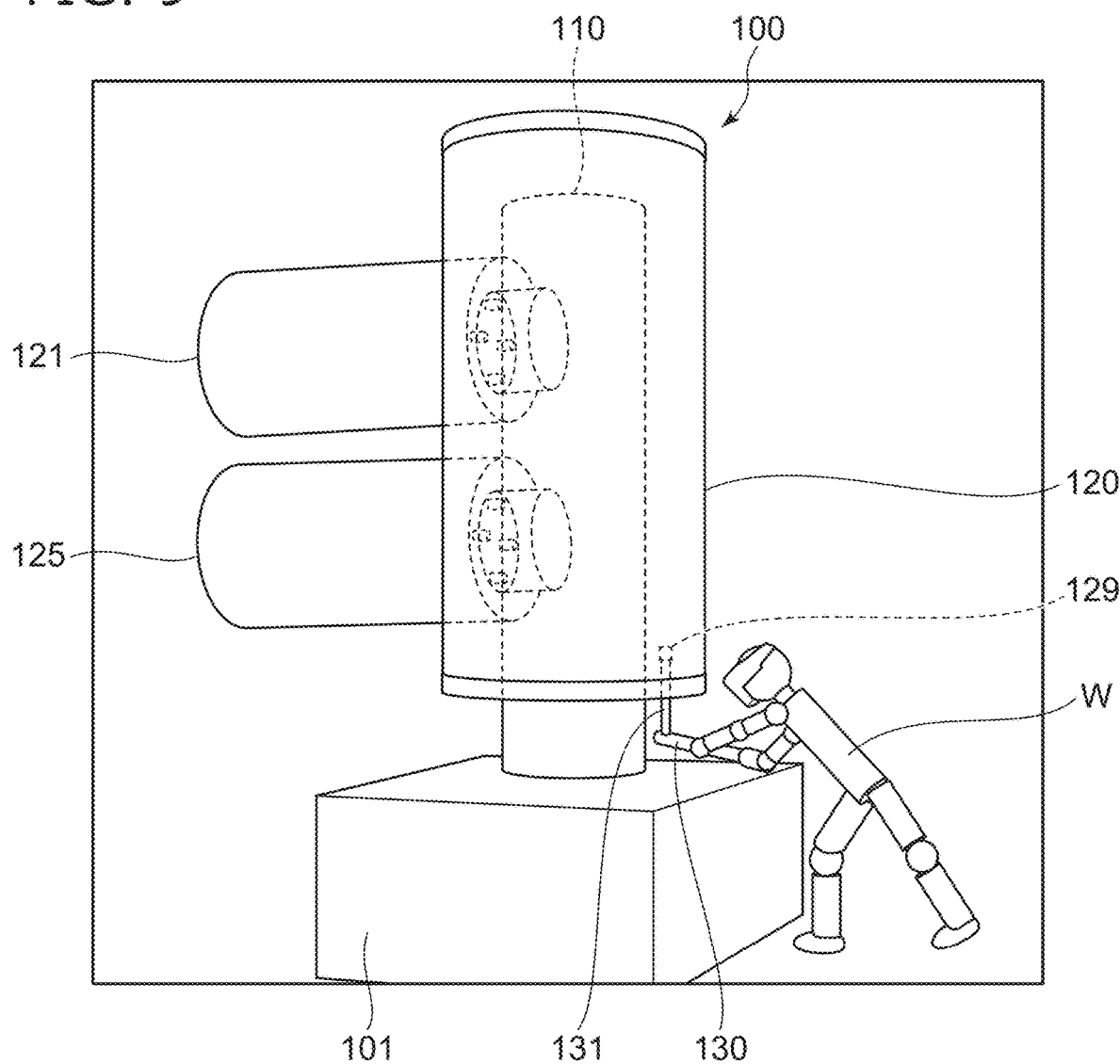
FIG. 9 is a schematic view showing another screw-tightening task.
Figure 10:
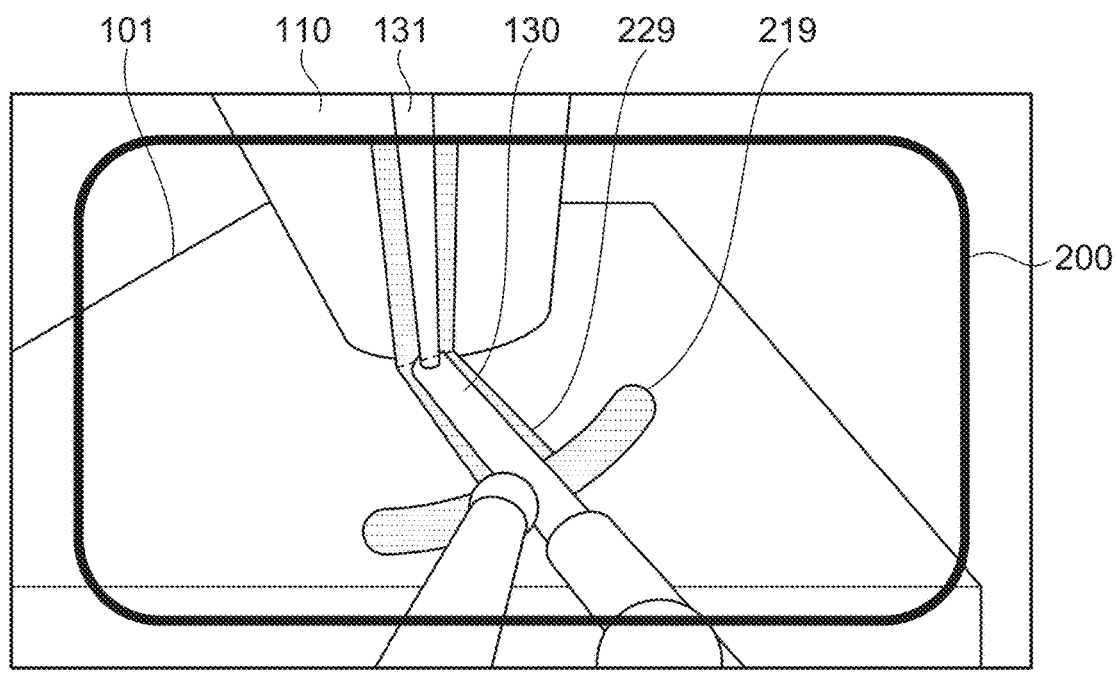
FIG. 10 is a schematic view showing an output example of the processing device according to the embodiment.

FIG. 9 is a schematic view showing another screw-tightening task. FIG. 10 is a schematic view showing an output example of the processing device according to the embodiment.

In the example shown in FIG. 9, the worker W is tightening a fastening location 129 that is inside the tubular member 120. The fastening location 129 cannot be seen from the worker W. Also, the circular columnar member 110 is located on a base 101. The worker W positions the wrench 130 between the base 101 and the tubular member 120. Then, the worker W inserts the extension bar 131 into the gap between the circular columnar member 110 and the tubular member 120 from under the tubular member 120 and performs screw-tightening for the fastening location 129.

FIG. 10 is an output example of the display device 20 when the task shown in FIG. 9 is being performed.

In the illustrated example, the hand of the worker W does not reach the position directly under the fastening location 129 due to the base 101. The worker W grips one end and the center of the wrench 130 and rotates the other end of the wrench 130. Therefore, the object 219 that corresponds to the fastening location 129 is positioned at the center vicinity of the wrench 130. The object 219 is another example of the first object.

The object 219 is displayed at the position at which the left hand of the worker W is located. The left hand of the worker W grips the center of the wrench 130; therefore, the left hand of the worker W moves in an arc-like shape when the other end of the wrench 130 is rotated. The shape of the object 219 is an arc-like shape corresponding to the range in which the left hand of the worker W can move.

As shown in FIG. 10, when the physical object for which contact with the first object is determined in the screw-tightening may move, it is favorable for the length of the first object in one direction to be greater than the length in another direction to correspond to the movement. For example, even though the worker W is performing the screw-tightening, an erroneous determination indicating that the body is separated from the first object and the screw is not being tightened can be avoided. The first data and the second data can be more accurately associated.

An object 229 connecting the fastening location 129 and the object 219 is bent to show the orientation of the tool. Specifically, a portion of the object 229 extends in one direction to show the position and orientation of a portion of the wrench 130. Another portion of the object 229 extends in a different direction to show the position and orientation of the extension bar 131. The object 229 is another example of the second object. As shown in FIG. 10, the shape of the second object is modifiable as appropriate according to the position of the fastening location, the tool to be used, the position of the hand, etc.

Figure 11:
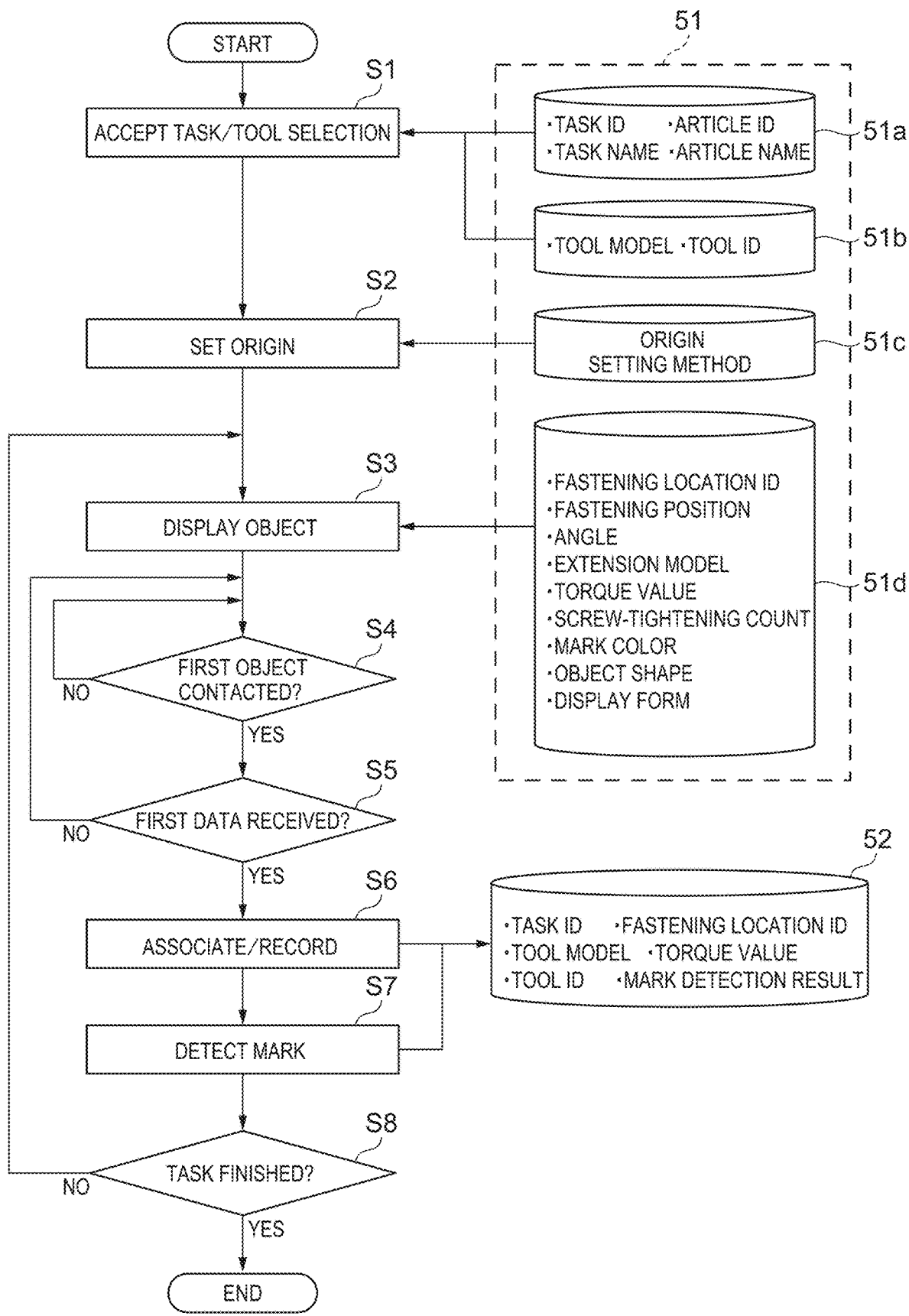
FIG. 11 is a flowchart showing a processing method according to the embodiment.

FIG. 11 is a flowchart showing a processing method according to the embodiment.

The memory device 50 stores master data 51 and history data 52. The master data 51 includes task master data 51a, tool master data 51b, origin master data 51c, and fastening location master data 51d. The master data 51 is prepared before the screw-tightening.

In the processing method M according to the embodiment, the processing device 10 accepts a selection of the task and a selection of the tool (step S1). The task and the tool are selected by the worker W. The task to be performed and the tool to be used may be instructed by a higher-level system, or the processing device 10 may accept a selection as an instruction. The processing device 10 may determine the task to be performed and the tool to be used based on data obtained from the imaging device 30 or another sensor, and the processing device 10 may accept a selection based on a determination.

The task ID, the task name, the article ID, and the article name are stored in the task master data 51a. The processing device 10 can accept any of the task ID, the task name, the article ID, or the article name as the selection of the task. The tool model and the tool ID are stored in the tool master data 51b. The tool model indicates the classification of the tool by the structure, exterior shape, performance, etc. The processing device 10 can accept one of the tool model or the tool ID as the selection of the tool. When there are multiple selection candidates for the selection of the task or the tool, the processing device 10 may output an inquiry of which candidate to select.

The processing device 10 refers to the origin master data 51c. The method for setting the origin for each task is stored in the origin master data 51c. The processing device 10 acquires the method for setting the origin for the selected task and sets the origin based on the input by the worker W (step S2). The method described with reference to FIG. 5A or FIG. 5B is applicable as the method for setting the origin.

The processing device 10 refers to the fastening location master data 51d. In the fastening location master data 51d, the fastening location ID is stored, and the fastening position, angle, extension model, torque value, screw-tightening count, mark color, object shape, and display form are stored for each fastening location ID. The fastening position indicates the position of each fastening location. The angle indicates the angle of the tool or the extension bar when the screw is tightened for each fastening location. The extension model indicates the classification of the extension bar by structure, exterior shape, performance, etc. The torque value indicates the magnitude of the torque necessary for the screw-tightening at each fastening location. The screw-tightening count indicates the screw-tightening count at each fastening location. The mark color is the color of the mark indicating that the screw-tightening is finished. The object shape indicates the shape of the object displayed according to each fastening location. The display form indicates the form of each displayed object. The display form is set for each screw-tightening count.

The processing device 10 causes the display of the first and second objects based on the set origin and the referenced data (step S3). The positions at which the first object and the second object are displayed are calculated based on the origin, fastening position, angle, extension model, tool model, etc.

For example, the length of the extension bar is specified according to the extension model. The first object is displayed at a position separated from the fastening position by the length of the extension bar at the set angle. The second object is displayed in a region having the length of the extension bar at the set angle with respect to the fastening position.

When the extension bar is not used, the length of the tool is specified according to the tool model. The first object is displayed at a position separated from the fastening position by a prescribed ratio of the length of the tool at the set angle. The prescribed ratio is set according to the position of the tool that is generally gripped by the worker. The second object is displayed in a region having the length of the prescribed ratio of the tool at the set angle with respect to the fastening position.

There are also cases where the worker cannot grip the end portion vicinity of the extension bar due to effects of an obstacle or the like in the screw-tightening. In such a case, the display position of the first object may be calculated using both the length of the extension bar and the length of the tool. For example, the angle of the tool with respect to the extension is specified according to the extension model and the tool model. The processing device 10 calculates, as the connection position between the extension bar and the tool, a position separated from the fastening position by the length of the extension bar at the set angle. The processing device 10 causes the first object to be displayed at a position separated from the connection position by a prescribed ratio of the length of the tool at the angle of the tool. For example, the prescribed ratio is set to "0.5". In other words, it is assumed that the worker will grip the center of the tool. The second object is displayed in the region between the fastening position and the connection position. Also, the second object is displayed in a region having the length of the prescribed ratio of the tool at the angle of the tool with respect to the connection position.

The processing device 10 repeats the determination of whether or not the prescribed physical object contacts the first object (step S4). When contact of the physical object with the first object is determined, the processing device 10 determines whether or not the first data related to the tightening is received from the tool 40 (step S5). When the first data is not received, the processing device 10 re-performs step S4. As described above, the determination result may be maintained for a preset amount of time after the contact of the physical object with the first object is determined. In such a case, the processing device 10 repeats step S5 while the determination result is maintained.

When it is determined that the prescribed physical object is in contact with the first object and the first data is received, the processing device 10 associates the first data and the second data related to the fastening location, and records the data in the history data 52 (step S6). In the illustrated example, the torque value is recorded as the first data; and the fastening location ID is recorded as the second data. Also, the task ID, the tool ID, and the tool model are associated with the first and second data and recorded.

Based on the image acquired by the imaging device 30, the processing device 10 detects the mark of the color set by the fastening location master data 51d (step S7). The processing device 10 further associates the detection result of the mark with the history data recorded in step S6, and records the result. The processing device 10 determines whether or not the task selected in step S1 is finished (step S8). The display of the object in step S3 is repeated when the task is not finished.

It is also possible for the worker to move the origin partway through the task. The worker inputs an instruction of the movement of the origin to the processing device 10. The instruction may be input using the input device 60 or may be input by a hand gesture indicating the instruction of the movement of the origin. When the input is accepted, the processing device 10 interrupts the processing being performed and transitions to step S2. The worker resets the origin by any of the methods described above. Accordingly, the first object and the second object are displayed based on the origin that was reset.

Figure 12:
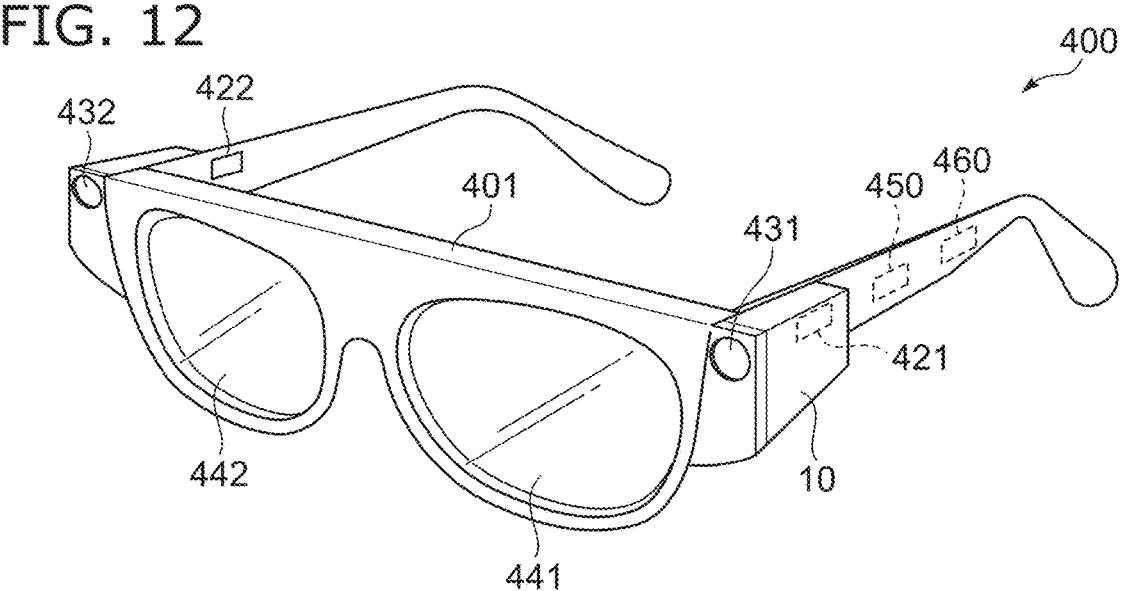
FIG. 12 is a schematic view illustrating a head mounted display according to the embodiment.

FIG. 12 is a schematic view illustrating a head mounted display according to the embodiment.

For example, the HMD 400 shown in FIG. 12 can be used in the embodiment. The HMD 400 includes the processing device 10, a frame 401, a projection device 421, a projection device 422, an image camera 431, a depth camera 432, a lens 441, a lens 442, a sensor 450, and a battery 460. HMD 400 may be a mixed-reality device.

The HMD 400 is binocular; and the two lenses 441 and 442 fit into the frame 401. The worker can visually check reality through the lenses 441 and 442. The projection devices 421 and 422 project information respectively to the lenses 441 and 442. For example, the projection devices 421 and 422 display the first object and the second object on the lenses 441 and 442. Only one of the projection device 421 or 422 may be provided, and the information may be displayed on only one of the lens 441 or 442.

The image camera 431 obtains a two-dimensional image by detecting visible light. The depth camera 432 irradiates infrared light and obtains a depth image based on the reflected infrared light. The sensor 450 is a six-axis detection sensor and can detect the angular velocity in three axes and the acceleration in three axes. The processing device 10 detects the movement of the visual field based on the detection result from the sensor 450. The battery 460 supplies the electrical power necessary for the components of the HMD 400.

The processing device 10 can communicate with the external memory device 50. The processing device 10 performs the processing shown in FIG. 11 by using the data obtained from the image camera 431 and the depth camera 432, the data of the memory device 50, etc.

Advantages of embodiments will now be described.

Conventionally, technologies of AR, MR, etc., have been applied to screw-tightening tasks. As a reference example, examples of technology include detecting a screw hole based on the image that is obtained, and displaying an object at the screw hole. The screw-tightening by the worker can be guided by the display of the object at the screw hole; and the screw-tightening task can be more efficient. In such technology, when the screw is detected as being screwed into the screw hole, data related to the screw hole and data obtained by a tool are associated.

On the other hand, when the article on which the screw-tightening is to be performed is large, and when fastening locations are hidden, etc., there are cases where the worker is uncertain where to position a physical object such as a hand, a tool, etc., when performing the task. There are also cases where the screw-tightening is difficult if the tool is not located at the specified position. For these problems, the processing device 10 according to the embodiment causes the virtual first object indicating the fastening location to be displayed at a position separated from the fastening location rather than at the fastening location. The first object is displayed at the position at which the physical object such as the hand of the worker, the tool, etc., or is located when performing the screw-tightening. The worker can easily ascertain where the physical object should be located by referring to the first object. According to the embodiment, the worker can be more effectively guided, and the worker can more efficiently perform the screw-tightening task.

Favorably, the processing device 10 also causes the display of the virtual second object in addition to the first object. The second object connects the fastening location and the first object. By displaying the second object, the worker can easily ascertain how the tool should be oriented after positioning the physical object at the position of the first object.

In the display by the processing device 10, when the fastening location is hidden by the article, a portion of the second object not hidden by the article is displayed, while another portion of the second object hidden by the article is not displayed. By hiding the second object according to the positional relationship with the article, the worker easily ascertains the position of the fastening location in the article. Or, the display form of the portion of the second object not hidden by the article may be different from the display form of the other portion of the second object hidden by the article. In such a case as well, similarly, the worker easily ascertains the position of the fastening location in the article.

When performing screw-tightening of the article, there are cases where some of the fastening locations cannot be seen from the worker (the imaging device). In such a case, fastening locations cannot be detected based on the image obtained by the imaging device. If the fastening location cannot be detected, an object that corresponds to the fastening location cannot be displayed. It is therefore favorable for the display position of the object to be calculated based on the origin rather than based on the result of the image processing. By using the origin, the first object and the second object can be displayed according to the fastening location even when the fastening location is not visible in the image.

When the fastening location is detected based on an image, the detection may be difficult if there is no easily-identifiable object such as a mark, barcode, or the like at the fastening location. On the other hand, there are cases where an easily-identifiable object cannot be provided due to quality control of the product, a specification, etc. When using an origin, an easily-identifiable object is unnecessary, and the first object and the second object corresponding to the task object can be displayed even when the task object is difficult to detect using the image.

Favorably, the first object is displayed at the position at which the hand of the worker is located. The processing device 10 determines contact between the first object and the hand of the worker. In general screw-tightening, the worker grips the tool by hand and performs the screw-tightening by operating the tool by hand. The worker can be more effectively guided by using the first object to indicate the position of the hand used to handle the tool.

Modification

Figure 13:
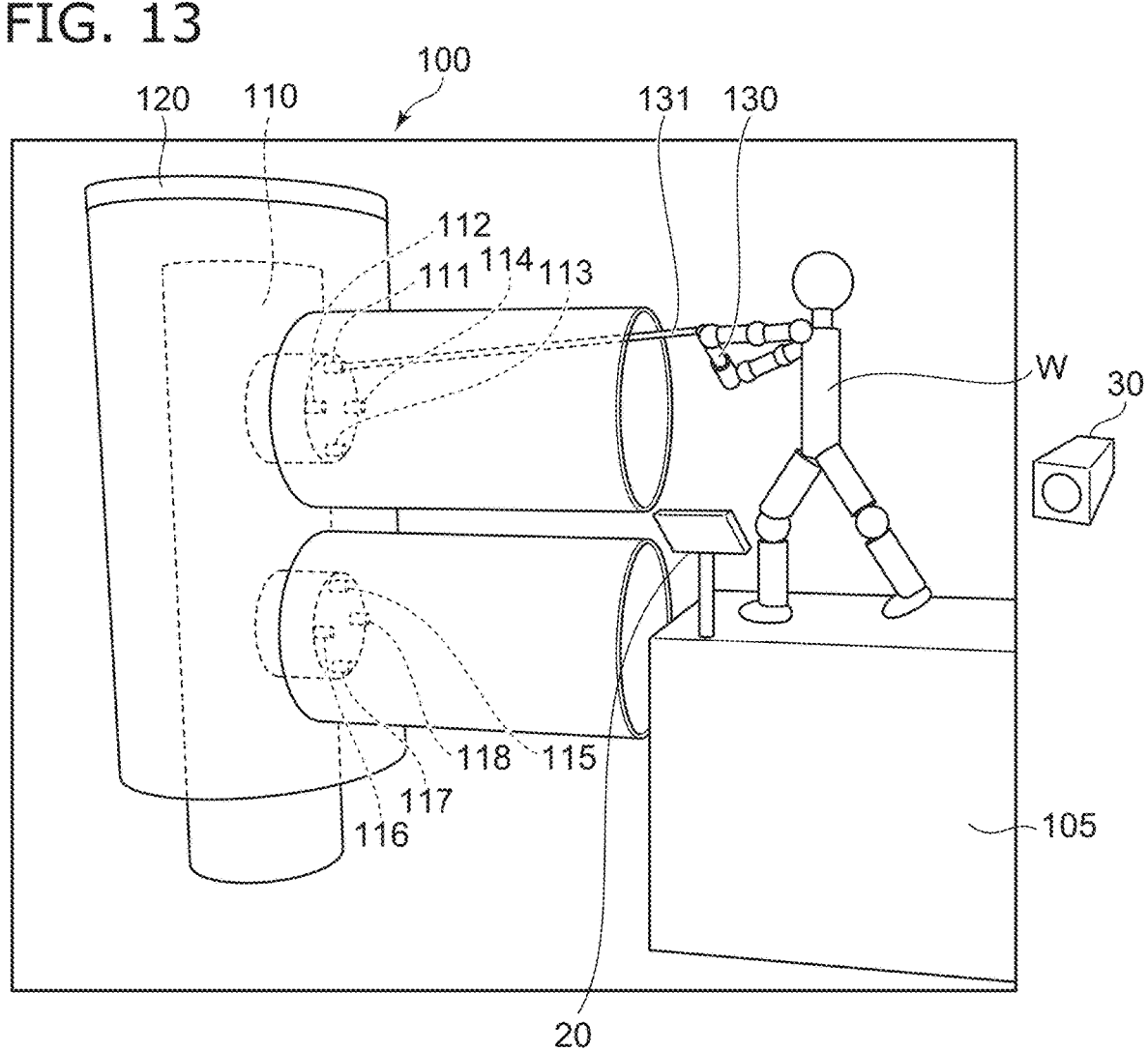
FIG. 13 is a schematic view showing a screw-tightening task.
Figure 14:
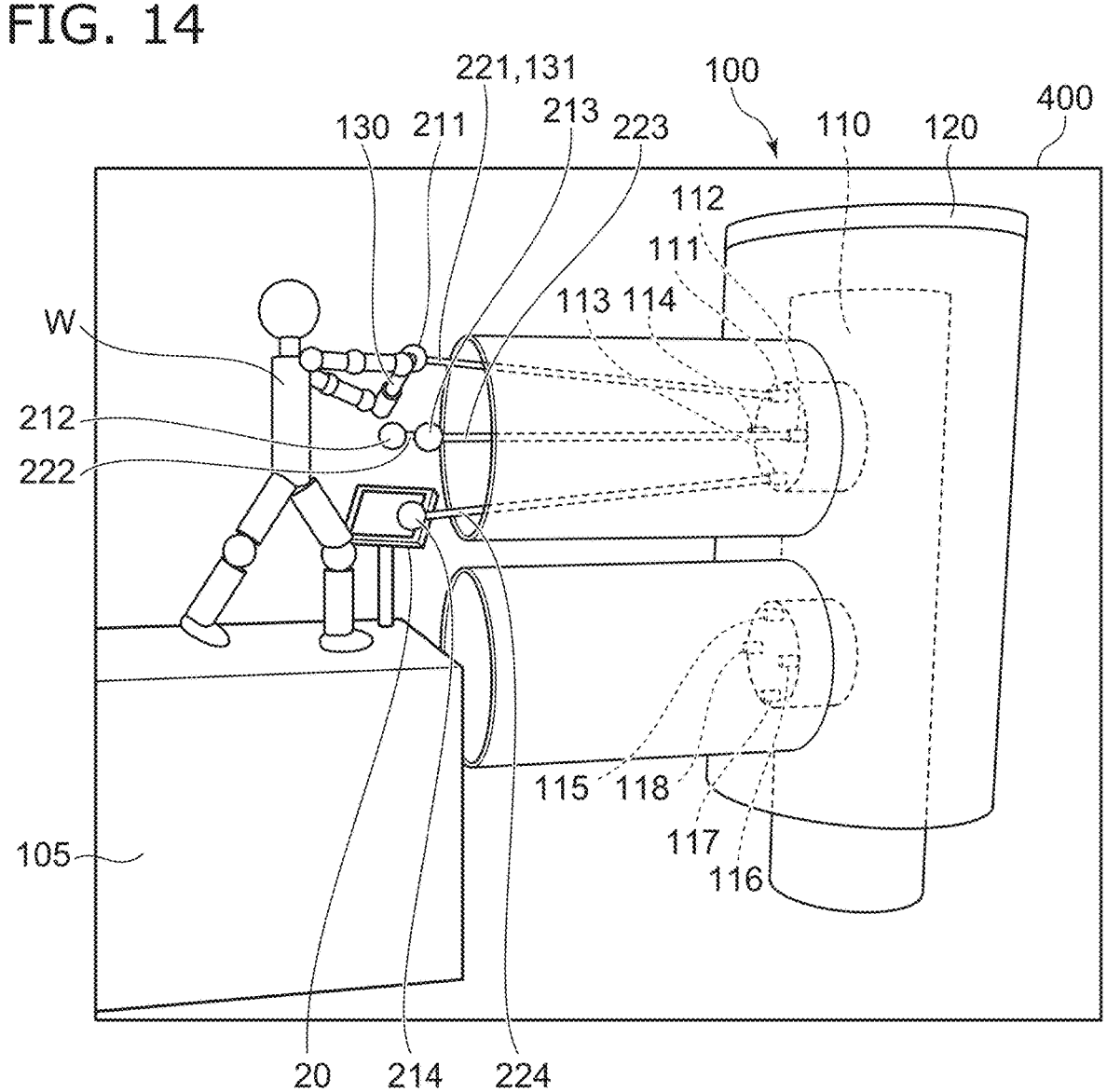
FIG. 14 is a schematic view showing an output example of a processing device according to a modification of the embodiment.

FIG. 13 is a schematic view showing a screw-tightening task. FIG. 14 is a schematic view showing an output example of a processing device according to a modification of the embodiment.

In the examples described above, a HMD is used as the display device 20 and the imaging device 30. The display device 20 and the imaging device 30 may be implemented using a device other than a HMD. For example, as shown in FIG. 13, the imaging device 30 images the worker W and the article 100 from the side.

The display device 20 is located proximate to the worker W. The processing device 10 displays the UI 400 shown in FIG. 14 in the display device 20. The image that is imaged by the imaging device 30, the objects 211 to 214, and the objects 221 to 224 are displayed in the UI 400. The worker W tightens screws at the fastening locations 111 to 114 while checking the UI 400.

According to the modification, the worker W can perform the screw-tightening task while viewing the information displayed in the display device 20. The worker W can be more effectively guided. However, to further increase the work efficiency of the worker W, it is favorable to use a HMD that includes the display device 20 and the imaging device 30 as shown in FIG. 12.

In the above, an example in which a screw is fastened to each fastening point is explained. The embodiment of the invention is applicable not only to the case where the screw is tightened to the fastening point but also to the case where the screw of the fastening point is loosened. For example, when maintenance, inspection, or repair of a product is performed, the screws at the fastening points are loosened. According to an embodiment of the invention, when the screw is loosened, the virtual first object indicating the fastening point is displayed. This makes it easy for workers to know where to place a physical object when loosening the screw. According to the embodiment, the worker can be guided more effectively and the worker can perform the work of loosening the screw more efficiently.

Even in the case of loosening the screw, the processing device 10 displays each virtual object based on the origin, as in the example described above. The processing device 10 also detects contact between each virtual object and the worker's hand or between each virtual object and a tool. While loosening the screw, the processing device 10 receives the first data (e.g., torque value) from the tool turning the screw. When receiving the first data from the tool, the processing device 10 associates the first data with the second data related to the fastening point.

Also, as in the above example, the processing device 10 may sequentially display the first object at each fastening point according to the order of loosening the screw. The processing device 10 may differ between the display forms of the first object corresponding to the fastening position where the screw is loosened and the display forms of the first object corresponding to the fastening position where the screw is not loosened.

Figure 15:
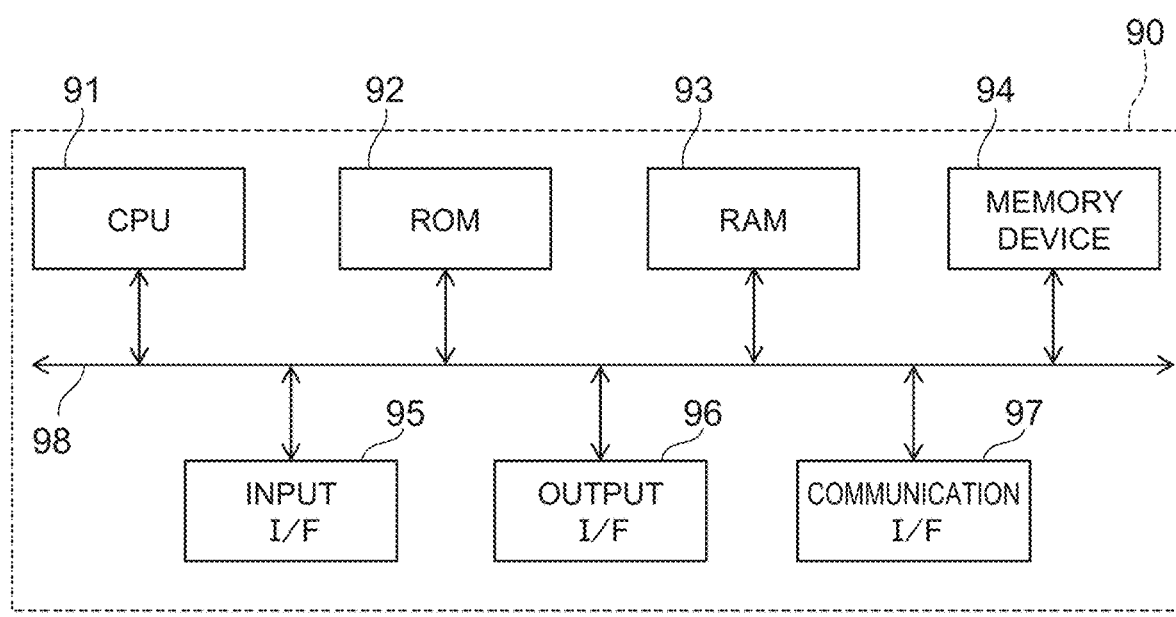
FIG. 15 is a schematic view showing a hardware configuration.

FIG. 15 is a schematic view showing a hardware configuration.

For example, a computer 90 shown in FIG. 15 is used as the processing device 10. The computer 90 includes a CPU 91, ROM 92, RAM 93, a memory device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. The memory device 94 may be used as the memory device 50 shown in FIG. 1. When executing the programs, the CPU 91 executes various processing by controlling configurations via a system bus 98.

The memory device 94 stores data necessary for executing the programs and/or data obtained by executing the programs. The memory device 94 includes a solid state drive (SSD), etc. The memory device 94 may be used as the memory device 50.

The input interface (I/F) 95 can connect the computer 90 to the input device 60. The CPU 91 can read various data from the input device 60 via the input I/F 95.

The output interface (I/F) 96 can connect the computer 90 and an output device. The CPU 91 can transmit data to the display device 20 via the output I/F 96 and can cause the display device 20 to display information.

The communication interface (I/F) 97 can connect the computer 90 and a device outside the computer 90. For example, the communication I/F 97 connects the tool 40 and the computer 90 by Bluetooth (registered trademark) communication.

The data processing of the processing device 10 may be performed by only one computer 90. A portion of the data processing may be performed by a server or the like via the communication I/F 97.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

The present invention may include the following embodiments.

(Clause 1)
A processing device,
the processing device causing a display of a first object at a position separated from a fastening location of a screw, the first object being virtual and indicating the fastening location,
the processing device associating first data and second data in a case where a prescribed physical object contacts the first object and the first data is received from a tool turning the screw, the second data being related to the fastening location.

(Clause 2)
The processing device according to clause 1, wherein
a second object also is displayed, and
the second object is virtual and connects the fastening location and the first object.

(Clause 3)
The processing device according to clause 2, wherein
when the fastening location is hidden by an article, a portion of the second object not hidden by the article is displayed and an other portion of the second object hidden by the article is not displayed, or a display form of the portion of the second object is different from a display form of the other portion of the second object.

(Clause 4)
The processing device according to any one of clauses 1 to 3, wherein
the first object is sequentially displayed for a plurality of the fastening locations.

(Clause 5)
The processing device according to any one of clauses 1 to 3, wherein
the first object is displayed for each of a plurality of the fastening locations, and
a display form of the first object is changed according to a tightening count for each of the plurality of fastening locations.

(Clause 6)
The processing device according to any one of clauses 1 to 5, wherein
a setting of an origin is accepted, and
the first object is displayed based on a position of the origin.

(Clause 7)
The processing device according to clause 6, wherein
a resetting of the origin can be accepted, and
when the origin is reset, the first object is displayed based on a position of the reset origin.

(Clause 8)
A processing device,
the processing device causing a display of a first object at a position separated from a fastening location of a screw, the first object being virtual and indicating the fastening location,
the processing device causing a display of a second object, the second object being virtual and connecting the fastening location and the first object.

(Clause 9)
A processing system, comprising:
the processing device according to any one of clauses 1 to 8; and
a display device on which the first object is displayed.

(Clause 10)
A head mounted display, comprising:
the processing device according to any one of clauses 1 to 9;
a display device on which the first object is displayed; and
an imaging device imaging an article, the article including the fastening location.

According to embodiments described above, a processing device, a processing system, a head mounted display, a processing method, a program, and a storage medium are provided in which a worker can be more effectively guided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A processing device,
the processing device causing a display of a first object at a position separated from a fastening location of a screw, the first object being virtual and indicating the fastening location,
the processing device associating first data and second data in a case where a prescribed physical object contacts the first object and the first data is received from a tool turning the screw, the second data being related to the fastening location.

2. The processing device according to claim 1, wherein
a second object also is displayed, and
the second object is virtual and connects the fastening location and the first object.

3. The processing device according to claim 2, wherein
when the fastening location is hidden by an article, a portion of the second object not hidden by the article is displayed and an other portion of the second object hidden by the article is not displayed, or a display form of the portion of the second object is different from a display form of the other portion of the second object.

4. The processing device according to claim 1, wherein the first object is sequentially displayed for a plurality of the fastening locations.

5. The processing device according to claim 1, wherein the first object is displayed for each of a plurality of the fastening locations, and
a display form of the first object is changed according to a tightening count for each of the plurality of fastening locations.

6. The processing device according to claim 1, wherein a setting of an origin is accepted, and
the first object is displayed based on a position of the origin.

7. The processing device according to claim 6, wherein a resetting of the origin can be accepted, and
when the origin is reset, the first object is displayed based on a position of the reset origin.

8. A processing system, comprising:
the processing device according to claim 1; and
a display device on which the first object is displayed.

9. A head mounted display, comprising:
the processing device according to claim 1;
a display device on which the first object is displayed; and
an imaging device imaging an article, the article including the fastening location.

10. A processing device,
the processing device causing a display of a first object at a position separated from a fastening location of a screw, the first object being virtual and indicating the fastening location,
the processing device causing a display of a second object, the second object being virtual and connecting the fastening location and the first object.

11. A processing method, comprising:
displaying a first object at a position separated from a fastening location of a screw, the first object being virtual and indicating the fastening location; and
associating first data and second data when a prescribed physical object contacts the first object and the first data is received from a tool turning the screw, the second data being related to the fastening location.

12. A non-transitory computer-readable storage medium storing a program,
the program causing a computer to execute the processing method according to claim 11.

* * * * *